(12) United States Patent
Nagarajan et al.

(10) Patent No.: US 9,928,520 B2
(45) Date of Patent: *Mar. 27, 2018

(54) REVERSE COUPONING

(71) Applicant: BANK OF AMERICA CORPORATION, Charlotte, NC (US)

(72) Inventors: Srinath Nagarajan, Charlotte, NC (US); Matthew Laine Donlan, Charlotte, NC (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 69 days.

This patent is subject to a terminal disclaimer.

(21) Appl. No.: 15/182,770

(22) Filed: Jun. 15, 2016

(65) Prior Publication Data

US 2016/0300256 A1   Oct. 13, 2016

Related U.S. Application Data

(63) Continuation of application No. 13/553,863, filed on Jul. 20, 2012, now Pat. No. 9,373,120.

(51) Int. Cl.
*G06Q 30/02* (2012.01)
*G06Q 50/00* (2012.01)

(52) U.S. Cl.
CPC ......... *G06Q 30/0215* (2013.01); *G06Q 30/02* (2013.01); *G06Q 30/0224* (2013.01); *G06Q 30/0234* (2013.01); *G06Q 30/0238* (2013.01); *G06Q 50/01* (2013.01)

(58) Field of Classification Search
None
See application file for complete search history.

(56) References Cited

U.S. PATENT DOCUMENTS

| | | |
|---|---|---|
| 7,624,068 B1 | 11/2009 | Heasley et al. |
| 8,010,403 B2 | 8/2011 | Kala et al. |
| 8,626,575 B1 | 1/2014 | Gong |
| 2003/0126011 A1* | 7/2003 | Bryman .............. G06Q 20/387 705/14.17 |
| 2003/0163331 A1 | 8/2003 | Podgurny et al. |
| 2004/0015414 A1 | 1/2004 | Sidlo et al. |
| 2006/0218577 A1 | 9/2006 | Goodman et al. |
| 2006/0253320 A1 | 11/2006 | Heywood |
| 2006/0253321 A1 | 11/2006 | Heywood |
| 2007/0174115 A1 | 7/2007 | Chieu et al. |
| 2007/0198921 A1 | 8/2007 | Collison et al. |
| 2008/0189169 A1 | 8/2008 | Turpin et al. |
| 2008/0262925 A1 | 10/2008 | Kim et al. |
| 2008/0288396 A1 | 11/2008 | Siggers et al. |
| 2009/0061884 A1 | 3/2009 | Rajan et al. |
| 2009/0070219 A1 | 3/2009 | D'Angelo et al. |
| 2009/0327308 A1 | 12/2009 | Carter et al. |

(Continued)

*Primary Examiner* — David J Stoltenberg
(74) *Attorney, Agent, or Firm* — Michael A. Springs; Moore & Van Allen PLLC; Anup Shrinivasan

(57) ABSTRACT

Embodiments of the invention are directed to systems, methods and computer program products for reverse couponing. An exemplary apparatus is configured to determine user information and account information associated with a user; adjust offer information associated with an offer based on the user information and the account information, wherein the offer enables the user to receive at least one of a discount or a rebate on a purchase from a merchant; and transmit the adjusted offer to the user.

20 Claims, 5 Drawing Sheets

(56) References Cited

U.S. PATENT DOCUMENTS

| | | |
|---|---|---|
| 2010/0094774 A1 | 4/2010 | Jackowitz et al. |
| 2010/0217670 A1 | 8/2010 | Reis et al. |
| 2011/0055008 A1 | 3/2011 | Feuerstein et al. |
| 2011/0087546 A1 | 4/2011 | Fordyce et al. |
| 2011/0087547 A1 | 4/2011 | Amaro et al. |
| 2011/0166931 A1 | 7/2011 | Joa et al. |
| 2011/0231305 A1 | 9/2011 | Winters |
| 2011/0246279 A1 | 10/2011 | Joa et al. |
| 2011/0251965 A1 | 10/2011 | Holm et al. |
| 2012/0047022 A1 | 2/2012 | Shamim et al. |
| 2012/0123857 A1 | 5/2012 | Surve et al. |
| 2012/0226530 A1* | 9/2012 | Gebb ............... G06Q 30/02 705/14.1 |
| 2012/0265819 A1 | 10/2012 | McGann et al. |
| 2012/0310831 A1* | 12/2012 | Harris ............... G06Q 30/02 705/44 |
| 2013/0006736 A1 | 1/2013 | Bethke et al. |
| 2013/0006756 A1 | 1/2013 | Heo |
| 2013/0179254 A1 | 7/2013 | Joa et al. |
| 2013/0204699 A1 | 8/2013 | MacNeille et al. |
| 2013/0346171 A1 | 12/2013 | Wright |
| 2014/0025446 A1 | 1/2014 | Nagarajan et al. |
| 2014/0025459 A1 | 1/2014 | Donlan et al. |
| 2014/0032290 A1 | 1/2014 | Nagarajan et al. |
| 2014/0032292 A1 | 1/2014 | Donlan et al. |
| 2014/0032294 A1 | 1/2014 | Donlan et al. |
| 2014/0074574 A1 | 3/2014 | Donlan et al. |
| 2014/0081719 A1 | 3/2014 | Blackhurst et al. |
| 2014/0149195 A1 | 5/2014 | Abbott et al. |
| 2014/0149201 A1 | 5/2014 | Abbott et al. |
| 2014/0278970 A1 | 9/2014 | Calman et al. |
| 2014/0278999 A1 | 9/2014 | Calman et al. |
| 2014/0279004 A1 | 9/2014 | Thomas et al. |
| 2015/0025492 A1 | 1/2015 | McCabe |

* cited by examiner

US 9,928,520 B2

REVERSE COUPONING

CROSS REFERENCE TO THE APPLICATION

The present application is a continuation application of U.S. non-provisional patent application Ser. No. 13/553,863, filed Jul. 20, 2012 of the same title; the content of which is also incorporated herein by reference in its entirety.

BACKGROUND

When an entity sends a targeted purchase offer to a potential customer, there is a greater likelihood that the potential customer actually takes advantage of the purchase offer. By sending purchase offers to potential customers who will likely use the purchase offers and excluding those who will likely not use the purchase offers, an entity can save millions of dollars in sending out purchase offers to those who will likely not use the purchase offers. Therefore, there is a need for a system to produce targeted purchase offers.

BRIEF SUMMARY

In some embodiments, an apparatus is provided for reverse couponing. The apparatus comprises at least one memory comprising a volatile memory and a non-volatile memory, wherein the volatile memory and the non-volatile memory are independent of each other; at least one processor; and a first module stored in the non-volatile memory, executable by the at least one processor, and configured to cause the at least one processor to electronically receive a first input information associated with a user, wherein the first input information comprises account information associated with a user's financial institution account and personal information associated with the user; store the first input information in a queue associated with the volatile memory until a second input information is received, wherein queuing further comprises reorganizing the first input information into the volatile memory; receive second input information associated with the user, wherein the second input information comprises social network information associated with the user; store the second input information in the queue associated with the volatile memory, wherein queuing the second input information further comprises reorganizing the second input information into the volatile memory; and determine a user profile based on at least the first input information and the second input information stored in the queue associated with the volatile memory; a second module stored in the non-volatile memory, executable by the at least one processor, and configured to cause the at least one processor to determine offer information associated with an offer based on at least the user profile determined using the first input information and the second input information stored in the queue associated with the volatile memory, the offer being associated with a variable discount or a rebate; adjust the offer information associated with the offer based on the user information and the account information, wherein the offer enables the user to receive at least one of a discount or a rebate on a purchase from a merchant at a predetermined time, wherein the purchase comprises a plurality of transactions executed by the user with the merchant, wherein adjusting the offer information comprises either increasing or decreasing the discount or the rebate, wherein adjusting further comprises determining that the user is not excluded from receiving at least one offer based on at least a first user exclusion rule; and determining that the offer from the merchant associated with a predetermined category code is not excluded from being presented to the user based on at least a first merchant exclusion rule; and determine that the user has executed the purchase with the merchant, wherein determining further comprises determining that the user is excluded from receiving the offer for the purchase based on at least a second user exclusion rule; and determining that the offer from the merchant is excluded from being presented to the user based on at least the second merchant exclusion rule; wherein the second user exclusion rule and the second merchant exclusion rule are applied before the purchase is settled at a predetermined future settlement date; and apply the at least one offer to a largest transaction among the plurality of transactions associated with the purchase executed by the user at the predetermined future settlement date based on at least determining that the user and the offer from the merchant are not excluded at the time of the execution of the purchase and are excluded at the predetermined future settlement date.

In some embodiments, the first module and/or the second module is configured to determine the user information and the account information associated with the user, wherein determining further comprises determining a purchase transaction to be executed by the user within a predetermined period of time in the future.

In some embodiments, the first module and/or the second module is further configured to cause the at least one processor to determine the offer is activated based on a preconfigured user preference prior to executing a transaction qualifying for the offer at a physical point of sale terminal of the merchant; and determine execution of the transaction qualifying for the offer at the physical point of sale terminal, wherein the merchant and the user are not alerted, at the point of sale terminal, about the discount or rebate on the transaction.

In some embodiments, the offer comprises a stored value card associated with a merchant or an electronic coupon.

In some embodiments, the first module and/or the second module is further configured to adjust the offer information, wherein adjusting further comprises adjusting an amount or a percentage of the discount or the rebate associated with a purchase transaction.

In some embodiments, the first module and/or the second module is further configured to adjust the offer information, wherein adjusting comprises adjusting a type of purchase transaction for which the offer can be used.

In some embodiments, the first module and/or the second module is further configured to adjust the offer information, wherein the adjusting comprises changing a merchant for which the offer can be used.

In some embodiments, the first module and/or the second module is further configured to transmit the offer to the user based on at least one of the user information or the account information.

In some embodiments, the first module and/or the second module is further configured to determine whether to transmit the offer to the user based on the at least one of the user information or the account information prior to adjusting the offer information associated with the offer.

In some embodiments, the first module and/or the second module is further configured to process the purchase transaction as part of a batch processing operation after the user executes a purchase transaction associated with the offer, wherein the batch processing operation comprises processing a plurality of financial institution accounts.

In some embodiments, the account information comprises a transaction history associated with the user's financial institution account, and wherein the transaction history comprises at least one of a type of a transaction, a frequency associated with the transaction, an amount associated with the transaction, or a merchant associated with the transaction, and wherein the user information comprises personal information associated with at least one of the user, a family member of the user, or a friend of the user, wherein the personal information comprises at least one of demographic information, salary information, contact information, residence address information, job profile information, or education information.

In some embodiments, the first module and/or the second module is further configured to present the offer via at least one of a user interface associated with the user's financial institution account, a user interface associated with the user's social network account, email, or text message.

In some embodiments, the first module and/or the second module is further configured to present the offer to the user on a portable mobile communication device.

In some embodiments, the offer comprises an offer to receive at least one of the discount or the rebate on at least one of a purchase previously made by the user, a purchase from a merchant from which the user previously made a purchase, an alternative to the purchase previously made by the user, an alternative to the purchase from the merchant from which the user previously made a purchase, or a product or service related to a purchase previously made by the user.

In some embodiments, the purchase comprises at least one of at least one purchase associated with a predetermined period, at least one purchase associated with a predetermined amount, an aggregate of a plurality of purchases, or a largest purchase.

In another aspect, a method for reverse couponing is provided. The method comprising electronically receiving, a first input information associated with a user, wherein the first input information comprises account information associated with a user's financial institution account and personal information associated with the user; storing the first input information in a queue associated with the volatile memory until a second input information is received, wherein queuing further comprises reorganizing the first input information into the volatile memory; receiving second input information associated with the user, wherein the second input information comprises social network information associated with the user; storing the second input information in the queue associated with the volatile memory, wherein queuing the second input information further comprises reorganizing the second input information into the volatile memory; and determining a user profile based on at least the first input information and the second input information stored in the queue associated with the volatile memory; a second module stored in the non-volatile memory, executable by the at least one processor, and configured to cause the at least one processor to: determining offer information associated with an offer based on at least the user profile determined using the first input information and the second input information stored in the queue associated with the volatile memory, the offer being associated with a variable discount or a rebate; adjusting the offer information associated with the offer based on the user information and the account information, wherein the offer enables the user to receive at least one of a discount or a rebate on a purchase from a merchant at a predetermined time, wherein the purchase comprises a plurality of transactions executed by the user with the merchant, wherein adjusting the offer information comprises either increasing or decreasing the discount or the rebate, wherein adjusting further comprises: determining that the user is not excluded from receiving at least one offer based on at least a first user exclusion rule; and determining that the offer from the merchant associated with a predetermined category code is not excluded from being presented to the user based on at least a first merchant exclusion rule; and determining that the user has executed the purchase with the merchant, wherein determining further comprises: determining that the user is excluded from receiving the offer for the purchase based on at least a second user exclusion rule; and determining that the offer from the merchant is excluded from being presented to the user based on at least the second merchant exclusion rule; wherein the second user exclusion rule and the second merchant exclusion rule are applied before the purchase is settled at a predetermined future settlement date; and applying the at least one offer to a largest transaction among the plurality of transactions associated with the purchase executed by the user at the predetermined future settlement date based on at least determining that the user and the offer from the merchant are not excluded at the time of the execution of the purchase and are excluded at the predetermined future settlement date.

In another aspect, the computer program product for reverse couponing is provided. The computer program product comprises a non-transitory computer-readable medium comprising a set of codes for causing a computer to: electronically receive a first input information associated with a user, wherein the first input information comprises account information associated with a user's financial institution account and personal information associated with the user; store the first input information in a queue associated with the volatile memory until a second input information is received, wherein queuing further comprises reorganizing the first input information into the volatile memory; receive second input information associated with the user, wherein the second input information comprises social network information associated with the user; store the second input information in the queue associated with the volatile memory, wherein queuing the second input information further comprises reorganizing the second input information into the volatile memory; and determine a user profile based on at least the first input information and the second input information stored in the queue associated with the volatile memory; a second module stored in the non-volatile memory, executable by the at least one processor, and configured to cause the at least one processor to: determine offer information associated with an offer based on at least the user profile determined using the first input information and the second input information stored in the queue associated with the volatile memory, the offer being associated with a variable discount or a rebate; adjust the offer information associated with the offer based on the user information and the account information, wherein the offer enables the user to receive at least one of a discount or a rebate on a purchase from a merchant at a predetermined time, wherein the purchase comprises a plurality of transactions executed by the user with the merchant, wherein adjusting the offer information comprises either increasing or decreasing the discount or the rebate, wherein adjusting further comprises: determining that the user is not excluded from receiving at least one offer based on at least a first user exclusion rule; and determining that the offer from the merchant associated with a predetermined category code is not excluded from being presented to the user based on at least a first merchant exclusion rule; and determine that the user has executed the purchase with the merchant, wherein determining further comprises: determining that the user is excluded from receiving the offer for the purchase based on at least a second user exclusion rule; and determining that the offer from the merchant is excluded from being presented to the user based on at least the second merchant exclusion rule; wherein the second user exclusion rule and the second merchant exclusion rule are applied before the purchase is settled at a predetermined future settlement date; and apply the at least one offer to a largest transaction among the plurality of transactions associated with the purchase executed by the user at the predetermined future settlement date based on at least determining that the user and the offer from the merchant are not excluded at the time of the execution of the purchase and are excluded at the predetermined future settlement date.

BRIEF DESCRIPTION OF THE DRAWINGS

Figure 1:
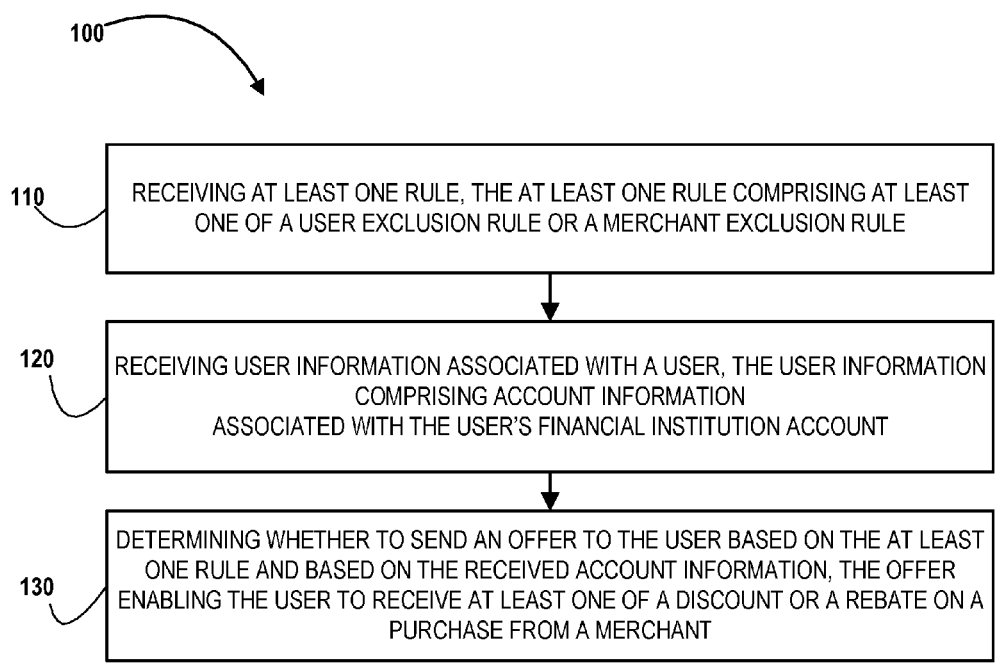
Figure 2:
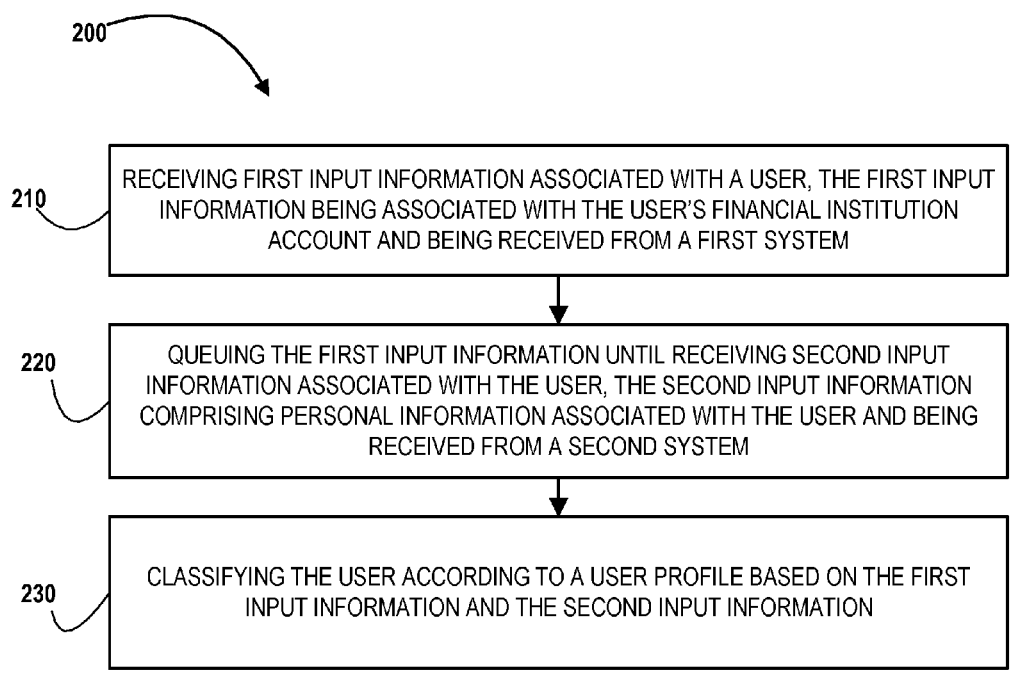
Figure 3:
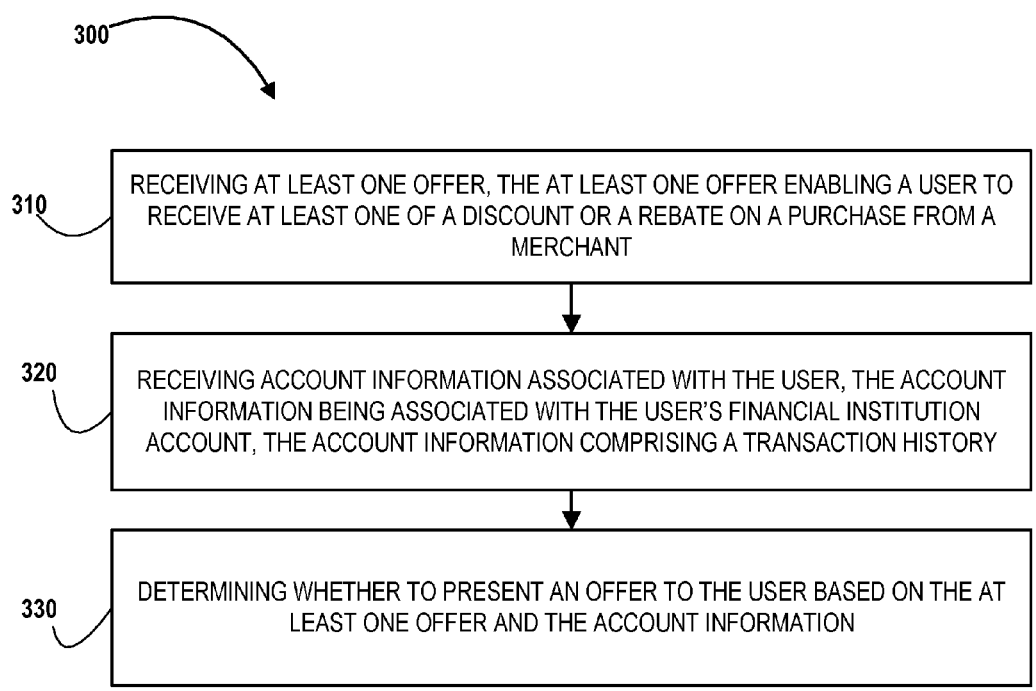
Figure 4:
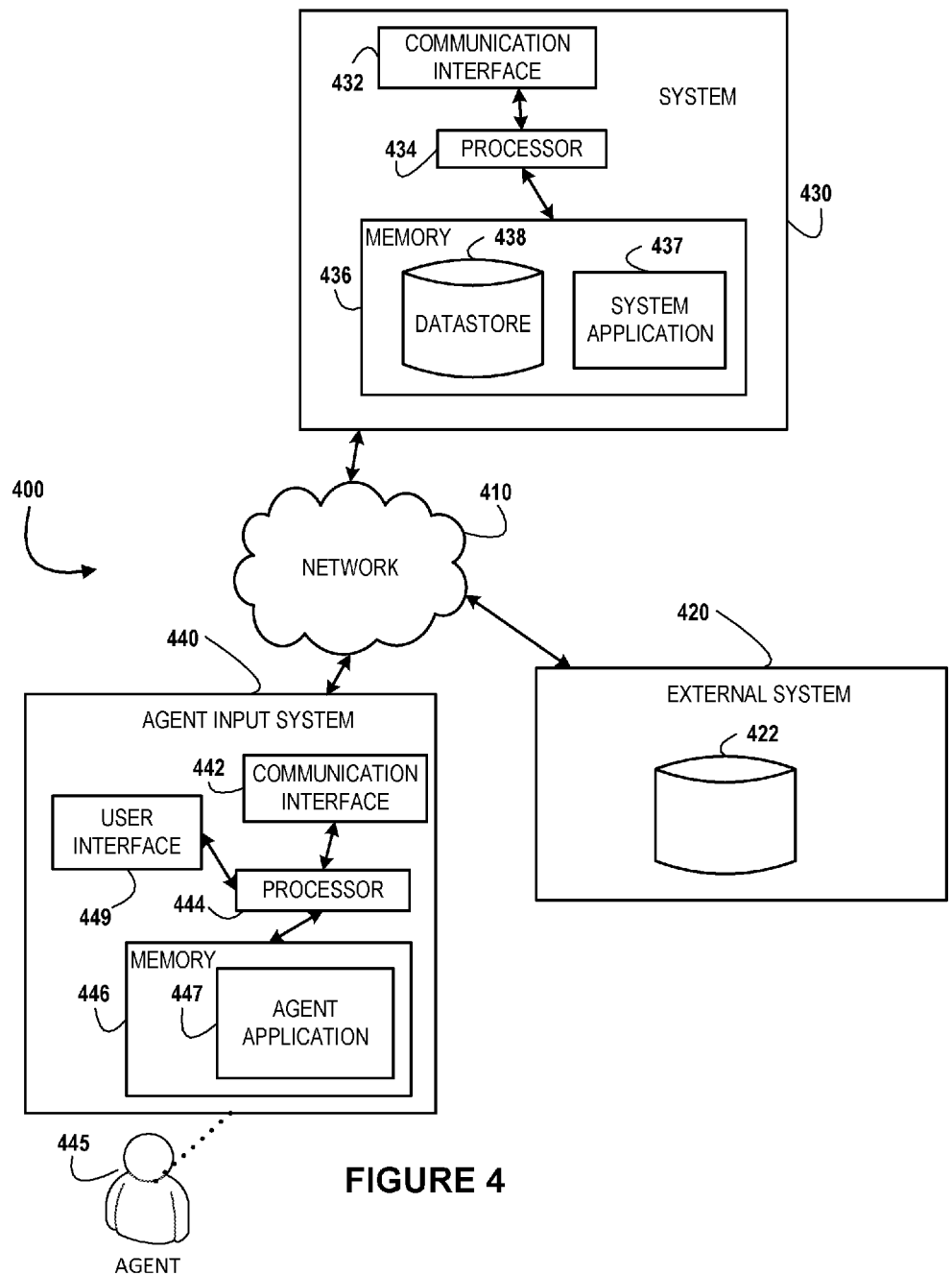
Figure 5:
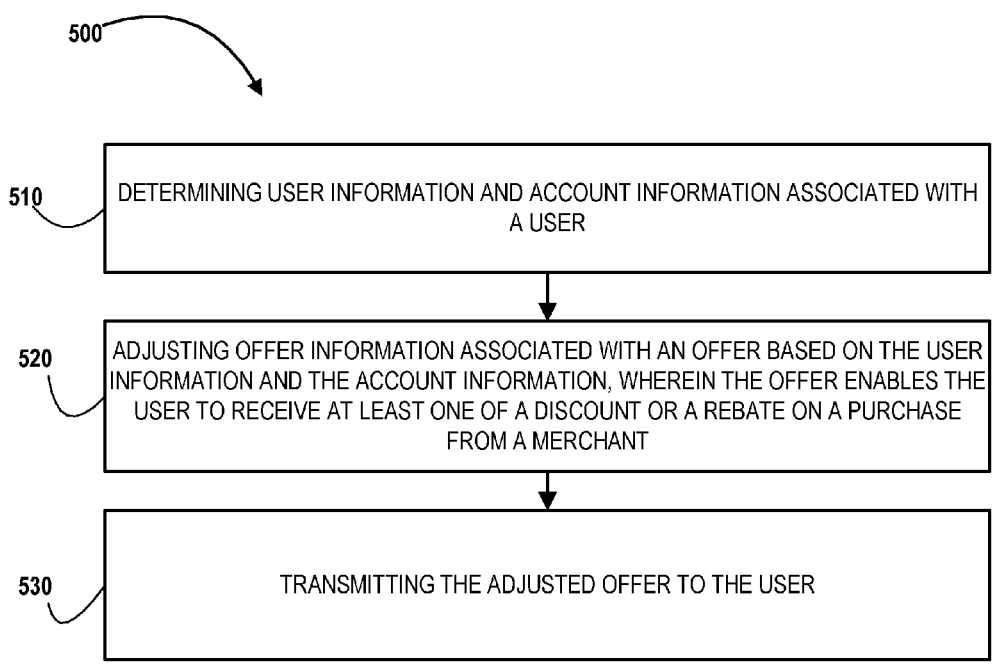

Having thus described embodiments of the invention in general terms, reference will now be made to the accompanying drawings, where:

FIG. 1 is a flowchart illustrating a general process flow for implementing rule-based offer association, in accordance with embodiments of the present invention;

FIG. 2 is a flowchart illustrating a general process flow for queuing input information for performing rule-based offer association, in accordance with embodiments of the present invention;

FIG. 3 is a flowchart illustrating a general process flow for implementing an intelligent offer tool, in accordance with embodiments of the present invention;

FIG. 4 is a block diagram illustrating technical components of a system for implementing the various processes described herein, in accordance with embodiments of the present invention; and FIG. 5 is a flowchart illustrating a general process flow for reverse couponing, in accordance with embodiments of the present invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Embodiments of the invention are directed to systems, methods and computer program products for implementing reverse couponing. The invention enables an entity to send targeted offers to a user that enables the user to receive at least one of a discount or a rebate on a purchase from a third-party merchant. As used herein, an offer may also be referred to as a coupon (e.g., an electronic coupon).

In some embodiments, an "entity" may be a financial institution. For the purposes of this invention, a "financial institution" may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In some embodiments, the entity may allow a user to establish an account with the entity. An "account" may be the relationship that the user has with the entity. Examples of accounts include a deposit account, such as a transactional account (e.g., a banking account), a savings account, an investment account, a money market account, a time deposit, a demand deposit, a pre-paid account, a credit account, a non-monetary user profile that includes only personal information associated with the user, or the like. The account is associated with and/or maintained by the entity. In other embodiments, an entity may not be a financial institution. In still other embodiments, the entity may be the merchant itself.

In some embodiments, the "user" may be a customer (e.g., an account holder or a person who has an account (e.g., banking account, credit account, or the like) at the entity) or potential customer (e.g., a person who has submitted an application for an account, a person who is the target of marketing materials that are distributed by the entity, a person who applies for a loan that not yet been funded).

As an example, an entity (e.g., a financial institution) may send an offer to a user (e.g., an account holder). The offer may be presented the user via at least one of the user's electronic banking account (e.g., online banking account, mobile banking account on a portable mobile communication device, or the like), the user's social network account, email, or text message. In some embodiments, the user may select an option associated with the presented offer to accept the offer. When the user accepts the offer, the offer is activated so that if the user uses an eligible payment method (as determined by the entity or the merchant) to make a purchase associated with the offer, the user receives the benefit associated with the offer. In other embodiments, the offer may be automatically activated if the user has previously chosen to automatically activate offers associated with particular types (e.g., associated with particular merchants or product or service types). In some embodiments, the entity or the merchant may determine that a user may choose among multiple eligible payment methods in order to make a purchase associated with the offer.

As an example, the activated offer may be a rebate of $5 on a purchase of $20 from a department store. The user may decide to use the offer by visiting the department store and making a purchase of $20. In some embodiments, at the point of sale, the user pays $20 for the user's purchase using an eligible payment method determined by the financial institution or the merchant (e.g., payment card, mobile device payment, check, or the like). When the transaction is processed by the financial institution at a predetermined settlement time in the future (e.g., as part of a periodic batch processing operation to generate monthly account statements), the financial institution provides a rebate of $5 to the user's financial institution account. Therefore, the department store, at the point of sale, may have no knowledge that the user will receive a rebate at some point in the future. In some embodiments, even the user may not be aware of the rebate at the point of sale (e.g., if the offer was automatically activated). In other embodiments, the point of sale terminal may provide an indication to at least one of the department store or the user that the user will receive a rebate at some point in the future.

Referring now to FIG. 1, a general process flow 100 is provided for implementing rule-based offer association. At block 110, the method comprises receiving at least one rule, the at least one rule comprising at least one of a user exclusion (or user filtering) rule or a merchant exclusion (or merchant filtering) rule. At block 120, the method comprises receiving user information associated with a user, the user information comprising account information associated with the user's financial institution account. At block 130, the method comprises determining whether to send an offer to the user based on the at least one rule and based on the received user information, the offer enabling the user to receive at least one of a discount or a rebate on a purchase from a merchant. As described previously, in some embodiments, the discount or rebate is received at a point of time in the future when the transaction that qualifies for the offer is processed by the financial institution.

In some embodiments, account information, as used herein, refers to information associated with the user's financial institution account(s) managed by a single financial institution. In other embodiments, account information may refer to information associated with the user's financial institution accounts managed by multiple distinct financial institutions.

As used herein, a user exclusion rule is a rule that excludes some users from receiving offers. In some embodiments, the at least one user exclusion rule comprises an affinity exclusion rule. Therefore, if the financial institution (or a merchant partner associated with the financial institution) already has an existing relationship (e.g., for providing or sending offers associated with the particular merchant) with some users via an affinity program, those users are excluded from receiving an offer. The affinity exclusion rule comprises at least one of a full affinity exclusion rule or a partial affinity exclusion rule. When the affinity rule comprises a full affinity exclusion rule, the user is completely excluded from receiving an offer (e.g., an offer associated with a particular merchant) if the financial institution (or a merchant partner associated with the financial institution) already has an existing relationship with the user. When the affinity rule comprises a partial affinity exclusion rule, the user is excluded from receiving an offer associated with a particular product, service, or industry associated with a particular merchant that already has an existing relationship with the user for the particular product, service, or industry, but the user may receive offers associated with other products, services, or industries associated with the particular merchant. Additionally or alternatively, the user is excluded from receiving an offer associated with a competitor of a particular merchant if that particular merchant already has an existing relationship with the user.

In some embodiments, the at least one user exclusion rule comprises a risk exclusion rule. Therefore, if a user is determined to be a risky user (e.g., has a credit score lower than a predetermined threshold), the user is excluded from receiving an offer. In some embodiments, the at least one user exclusion rule comprises an account exclusion rule. Therefore, for example, if a user's account has a balance (or another account characteristic) that is lower than predetermined threshold, the user is excluded from receiving an offer.

In some embodiments, a merchant exclusion rule is a rule that excludes some merchants from providing offers to users associated with the financial institution. In some embodiment, the at least one merchant exclusion rule comprises a merchant category code exclusion rule. Therefore, a merchant associated with a predetermined merchant category code (e.g., a healthcare code) is excluded from providing an offer. However, the financial institution may set up a list of merchants that trigger exceptions. Merchants that trigger exceptions can provide offers even if these merchants are associated with the excluded merchant category codes.

In some embodiments, the account information comprises a transaction history associated with the user's financial institution account. The transaction history includes the types of transactions, frequency of transactions, amount of each transaction, merchants associated with transactions, account balance history, or the like. Additionally or alternatively, the account information may or may not comprise information associated with incorrect, inconsistent, incomplete, or corrupted transactions. As used herein, a transaction may comprise a purchase, a deposit, a withdrawal, a credit, a debit, or the like.

In some embodiments, the user information comprises other information as well. For example, in some embodiments, the user information comprises personal information (e.g., demographic information, salary information, contact information (mailing address, email address, phone number, or the like), residence address history, education information, job profile information, or the like) associated with the user. In some embodiments, the personal information further comprises social network information associated with the user's social network account or other non-account related information associated with the user. In some embodiments, the user information further comprises user information (e.g., personal information, account information, or the like) associated with the user's immediate or extended family members or contacts (e.g., as determined from social network information).

In some embodiments, when a purchase transaction is processed by the financial institution at a predetermined time in the future (i.e., at settlement time or processing time), the system determines whether the offer is still active and whether the offer is still valid with respect to both the user and the merchant. This post-transaction process may be referred to as an offer reconciliation process. The offer is still active if the offer has not been revoked by at least one of the financial institution or the merchant and/or if the offer has not expired.

The offer is valid with respect to the merchant if the merchant is not excluded under any merchant exclusion rules. As described previously, the merchant's offer may be transmitted to or presented to the user if the merchant is not excluded under any merchant exclusion rules. In some embodiments, in order for the offer to be valid, the merchant cannot be excluded under any merchant exclusion rules that were in force at the time of the purchase transaction. Additionally or alternatively, in some embodiments, in order for the offer to remain valid, the merchant cannot be excluded under any merchant exclusion rules that are in force at the time of settlement of the offer. Therefore, in some embodiments, the merchant cannot be excluded under any new merchant exclusion rules that have been introduced since the purchase transaction.

The offer is valid for the user if the user is not excluded under any user exclusion rules. As described previously, the user is presented with the merchant's offer if the user is not excluded under any user exclusion rules. In some embodiments, in order for the offer to be valid, the user cannot be excluded under any user exclusion rules that were in force at the time of the purchase transaction. Additionally or alternatively, in some embodiments, in order for the offer to remain valid, the user cannot be excluded under any user exclusion rules that are in force at the time of settlement of the offer. Therefore, in some embodiments, the user cannot be excluded under any new user exclusion rules that have been introduced since the purchase transaction.

If both the user and the merchant are not excluded at the time of settlement, the offer is still valid and the financial institution provides a rebate to the user's financial institution account. In some embodiments, if at least one of the user or the merchant is excluded at the time of settlement, the offer is invalid and the financial institution does not provide a discount or rebate to the user's financial institution account. However, in alternate embodiments, even if at least one of the user or the merchant is excluded at the time of settlement, the offer remains valid as long as the user and the merchant were not excluded at the time of the purchase transaction, and consequently the financial institution provides a discount or rebate to the user's financial institution account.

Referring now to FIG. 2, a general process flow 200 is provided for queuing input information for performing rule-based offer association. The input information may include various types of information associated with a user. For example, the input information may include account information associated with the user's financial institution account and personal information associated with the user or the user's financial institution account. In some embodiments, the input information may include information received from external systems (e.g., systems not managed by the financial institution that manages the user's financial institution account). For example, the input information may include social network information associated with the user's social network account. Therefore, each type of input information is queued on a single queue (or multiple queues) until enough input information is received to classify the user based on one or more predetermined user profiles as described below. The invention is not limited to any duration of time that the input information spends on a queue.

At block 210, the method comprises receiving first input information associated with a user, the first input information being associated with the user's financial institution account and being received from a first system. At block 220, the method comprises queuing the first input information until receiving second input information associated with the user, the second input information comprising personal information associated with the user and being received from a second system. At block 230, the method comprises classifying the user according to a user profile based on the first input information and the second input information.

The first system is separate from the second system. In some embodiments, the first system and the second system may be managed by different entities. For example, the first system is managed by a financial institution that manages the user's financial institution account, and the second system is managed by an external entity that provides personal information regarding the user to the financial institution.

In alternate embodiments, the second input information, in addition to or instead of comprising personal information associated with the user and being received from a second system, comprises information associated with the user's financial institution account and is received from a third system that is managed by the financial institution. The third system is distinct from both the first and second systems, and the account information received from the third system is different from the account information received from the first system. For example, the account information received from the first system comprises the transaction history for a predetermined period of time (e.g., the previous three months), and the account information received from the third system comprises information regarding bill payment history associated with bills being paid from funds associated with the user's financial institution account. Alternatively, the account information received from the third system comprises information regarding mortgage payments associated with a mortgage loan provided by one of the financial institution that manages the user's financial institution account or a different financial institution. Alternatively, the account information received from the third system comprises the user's status. In some embodiments, the status may indicate whether the user is eligible to receive offers associated with particular purchases (either a past purchase or a future purchase) or particular merchants. In some embodiments, the status may indicate the standing of the user's financial institution account.

In other alternate embodiments, the first input information comprises personal information associated with the user that is received from the second system. This first input information is queued until second input information associated with the user's financial institution account is received from the first system.

In some embodiments, the first input information comprises information associated with single-holder accounts (no joint holders) associated with the user, and the second input information comprises information associated with joint accounts associated with the user.

In some embodiments, the process flow 200 further comprises receiving at least one rule; the at least one rule comprising at least one of a user exclusion rule or a merchant exclusion rule. In some embodiments, the process flow 200 further comprises determining whether to send an offer to the user based on the at least one rule and based on the received first input information and second input information, the offer enabling the user to receive at least one of a discount or a rebate on a purchase from a merchant.

In some embodiments, the first input information comprises a transaction history associated with the user's financial institution account. In some embodiments as described herein, the transaction history may be associated with a predetermined time period (e.g., the previous three months). The transaction history includes the types of transactions, frequency of transactions, amount of each transaction, merchants associated with transactions, account balance history, or the like. Additionally or alternatively, the account information may or may not comprise information associated with incorrect, inconsistent, incomplete, or corrupted transactions. As used herein, a transaction may comprise a purchase, a deposit, a withdrawal, a credit, a debit, or the like.

In some embodiments, the second input information (e.g., personal information) comprises demographic information, salary information, contact information (mailing address, email address, phone number, or the like), residence address history, social network information, education information, job profile information, or the like. In some embodiments, the second input information may also comprise personal information or account information associated with the user's immediate or extended family members or contacts (e.g., as determined from social network information).

In some embodiments, the user profile comprises a collection of users that are associated with similar characteristics. These characteristics may relate to the users' account transactional behavior (e.g., types of transactions, frequency of transactions, amount of each transaction, merchants associated with transactions, account balance history, or the like). As used herein, a transaction may comprise a purchase, a deposit, a withdrawal, a credit, a debit, or the like. Additionally or alternatively, these characteristics may relate to the users' personal characteristics (e.g., demographic information, salary information, location information, social network information, education information, job profile information, or the like).

In some embodiments, the first input information comprises account information or personal information associated with the user, and the second input information comprises account information or personal information associated with the user. Additionally, the financial institution may establish one or more criteria (e.g., the exclusion rules described herein) to determine whether the user qualifies to receive an offer associated with a merchant. Therefore, as an example, a user qualifies for an offer (or an offer is sent to a user) if two pieces of information (e.g., the user's transaction history and the user's mailing address) are received. The transaction history is received as part of the first input information and waits on a first queue. At a later point in time, the mailing address is received as part of the second input information. When the mailing address is received, the system determines that the criteria has been satisfied, and the first input information is combined with the second input information to determine that the user qualifies for the offer (or to determine that the offer can be transmitted to the user).

In some embodiments, the queue comprising the first input information is reorganized into a cached area of the system. Additionally or alternatively, the queue comprising the second input information is reorganized into a cached area of the system. This reorganization process improves the processing speed of any process that uses at least one of the first input information or the second input information.

In some embodiments, the system associated with the financial institution receives account information or personal information from a source either external to or internal to the financial instruction. For example, the system receives transaction history associated with a user from a merchant. The system described herein is enabled to receive information (e.g., a string of information) from an external source and identify and exclude some personal information (e.g., social security number, credit card number, or the like) associated with the user, where the excluded personal information is not considered in processing the input information associated with the user (e.g., determining whether the user qualifies to receive an offer). Therefore, for example, the system is enabled to determine a nine digit number (could be a social security number) in the string of information received from the merchant and exclude the nine digit number. As a further example, the system is enabled to determine a sixteen digit number (could be a credit or debit card number) in the string of information received from the merchant and exclude the sixteen digit number.

Referring now to FIG. 3, a general process flow 300 is provided for implementing an intelligent offer tool. At block 310, the method comprises receiving at least one offer, the at least one offer enabling a user to receive at least one of a discount or a rebate on a purchase from a merchant. At block 320, the method comprises receiving account information associated with the user, the account information being associated with the user's financial institution account, the account information comprising a transaction history. At block 330, the method comprises determining whether to present an offer to the user based on the at least one offer and the account information. Therefore, the determining step comprises matching an offer to an account (e.g., based on the account information) such that there is a high likelihood (e.g., greater than a threshold probability) that the user associated with the account uses the offer to make a purchase using a payment method associated with the account.

In some embodiments, at block 320, the method further comprises receiving user information associated with the user. The user information includes both account information and personal information associated with the user as described previously with respect to FIGS. 1 and 2. In such embodiments, at block 330, the method comprises determining whether to present an offer to the user based on the at least one offer and the user information.

In some embodiments, the process flow 300 further comprises determining, from the transaction history, whether to exclude a transaction, the excluded transaction being associated with at least one of incorrect, inconsistent, incomplete, or corrupted merchant information or incorrect, inconsistent, incomplete, or corrupted transaction information. Therefore, if a merchant no longer exists, transactions associated with that merchant are excluded. Additionally, if there were inconsistencies in the transaction or merchant information between when the transaction was executed (i.e., when the purchase was made) and when the transaction was processed by the financial institution, such a transaction is excluded as well. Additionally, in some embodiments, an excluded transaction may be a transaction disputed by at least one of the user or the merchant. Excluded transactions are excluded from the process of determining whether to present an offer to a user.

In some embodiments, the system does not exclude a transaction. Instead, the system intelligently determines whether transactions have been incorrectly keyed-in or whether transactions comprise incorrect merchant information. For example, the system intelligently determines that a merchant's name has changed (e.g., from Merchant 'A' to Merchant 'B'), and considers transactions associated with both Merchant 'A' and Merchant 'B' as being associated with the same merchant. As a further example, the system may determine that a transaction is only partially complete (e.g., missing merchant information or price information, or the like). In such an instance, the system may determine that available information associated with the partially complete transaction is similar to one or more other transactions in the transaction history. In such an instance, the system may add information to the partially complete transaction based on the one or more similar transactions or based on other information provided to the system. As a further example, the system may determine that a transaction may have incorrect information (e.g., a price that is too high or too low, a merchant's name spelled incorrectly, or the like). In such an instance, the system may determine that information associated with the inconsistent or incorrect transaction is similar to one or more other transactions in the transaction history. In such an instance, the system may rectify the inconsistent or incorrect transaction based on the one or more similar transactions or based on other information provided to the system.

In some embodiments, the presented offer is associated with a selected payment method. Exemplary payment methods include paying via a credit card, debit card, personal check, mobile device, or the like. The exemplary payment methods are not limited to those described herein. In some embodiments, the payment method is selected by at least one of the financial institution, the merchant, or the user.

In some embodiments, the offer is presented via at least one of a user interface associated with the user's financial institution account (e.g., online banking account, mobile banking account on a portable mobile communication device, or the like) or a user interface associated with the user's social network account. In some embodiments, the offer is inserted into or presented alongside (e.g., on the right, left, top, bottom side of a transaction, or between multiple transactions) the transaction history that is presented on the user's online banking account or mobile banking account. Therefore, for example, if ten transactions are listed in the transaction history, the offer may be presented between the fourth and fifth transactions. In some embodiments, the offer may be related to the transaction which the offer is presented alongside (e.g., the fourth and/or fifth transaction in the above example). For example, if the fourth transaction is a purchase of item 'A' from merchant 'A,' the offer is for a purchase of item 'A' (e.g., from any merchant) or for a purchase from merchant 'A' (e.g., for any item) or for a purchase of item 'A' from merchant 'A.' Alternatively, the offer may be for a purchase of a substitute of item 'A' (e.g., from merchant 'A' or from any other merchant). In some embodiments, the offer is transmitted to the user's email account. In other embodiments, the offer is transmitted, via text message, to the user's mobile device.

In some embodiments, the presented offer is an offer to receive at least one of a discount or a rebate on at least one of a purchase previously made by the user (e.g., a previous transaction associated with the user's financial institution account), a purchase from a merchant from which the user previously made a purchase, an alternative to the purchase previously made by the user, or an alternative to the purchase from the merchant from which the user previously made a purchase. The alternative to the purchase may be determined based on transaction histories associated with a plurality of financial institution accounts associated with multiple users.

In some embodiments, the presented offer is an offer to receive at least one of a discount or a rebate on a product or service related to a previous purchase made by the user. For example, if the user previously bought a stove, the offer is a discount or rebate for a dishwasher or a stove maintenance service.

In some embodiments, an offer that is sent to or presented on a financial institution account associated with a first member of a family may be used (or redeemed) by a second member of the family. In some embodiments, the second member of the family may use the offer even if the second member is not associated with the financial institution account associated with the first member. For example, the offer associated with a particular merchant may be transmitted to (or linked to) a credit card account associated with a first family member. When the second member of the family makes a purchase that qualifies for the offer using the second member's credit card (or any other qualifying payment method), the second member receives the rebate after making the purchase. The financial institution may have access to information that indicates that the second member is a family member of the first member even if the second member is not listed as being associated with the financial institution account associated with the first member.

Additionally, in some embodiments, as part of the previously described offer reconciliation process at the time of settlement of the offer, the system determines whether the account information substantially matches the offer information. If the account information has changed since the purchase transaction such that the account information no longer substantially matches the offer information, the offer may be deemed to be invalid and the financial institution does not provide a rebate to the user's financial institution account. However, in other embodiments, even if the account information has changed since the purchase transaction, the offer remains valid and the financial institution provides a rebate to the user's financial institution account.

Referring now to FIG. 4, FIG. 4 presents an exemplary block diagram of the system environment 400 for implementing the process flows 100, 200, 300, and 500 described in FIGS. 1, 2, 3, and 5 in accordance with embodiments of the present invention. As illustrated, the system environment 400 includes a network 410, an external system 420, a system 430, and an agent input system 440. Also shown in FIG. 4 is an agent 445 of the agent input system 440. The agent 445 may be a person who uses the agent input system 440 to execute an agent application 447 or uses the agent input system 440 to initiate execution of a system application 437. The agent application 447 and/or the system application 437 may incorporate one or more parts of the process flows 100, 200, and 300. The agent may be an employee of the entity that manages the system 430 and/or the external system 420. In other embodiments, the agent may not be an employee of an entity, but may still provide a service under the direction and/or supervision of the entity. Alternatively, the agent input system 440 may be a user input system associated with a user of a financial institution account as described herein. The features associated with the agent input system 440 are also applicable to the user input system. As described herein, a user input system may be a portable mobile device such as a portable mobile telecommunication device or a portable tablet computer.

As shown in FIG. 4, the external system 420, the system 430, and the agent input system 440 are each operatively and selectively connected to the network 410, which may include one or more separate networks. In addition, the network 410 may include a local area network (LAN), a wide area network (WAN), and/or a global area network (GAN), such as the Internet. The network may also include a mobile telecommunication network. It will also be understood that the network 410 may be secure and/or unsecure and may also include wireless and/or wireline and/or optical interconnection technology.

The external system 420 may be any computing or non-computing system that transmits information to the system 430. Additionally or alternatively, information from the system 430 may be transmitted to the external system 420. As presented in FIG. 4, the external system 420 comprises at least one datastore 422. The datastore 422 may comprise information relating to at least one of the user, the user's financial institution account, offers, rules related to targeting offers to users, personal information, or the like. As used herein, the terms "data" and "information" may be used interchangeably.

The agent input system 440 may include any computerized apparatus that can be configured to perform any one or more of the functions of the agent input system 440 described and/or contemplated herein. For example, the agent 445 may use the agent input system 440 to transmit and/or receive information or commands to and from the system 430. In some embodiments, for example, the agent input system 440 may include a personal computer system, a mobile computing device, a mobile phone, a personal digital assistant, a network device, a mobile phone, and/or the like. As illustrated in FIG. 4, in accordance with some embodiments of the present invention, the agent input system 440 includes a communication interface 442, a processor 444, a memory 446 having an agent application 447 stored therein, and an agent interface 449. In such embodiments, the communication interface 442 is operatively and selectively connected to the processor 444, which is operatively and selectively connected to the agent interface 449 and the memory 446. In some embodiments, the agent 445 may use the agent application 447 to execute processes described with respect to the process flows described herein, or may initiate the system 430 to execute the process flows described herein.

Each communication interface described herein, including the communication interface 442, generally includes hardware, and, in some instances, software, that enables the agent input system 440, to transport, send, receive, and/or otherwise communicate information to and/or from the communication interface of one or more other systems on the network 410. For example, the communication interface 442 of the agent input system 440 may include a modem, transceiver, server, electrical connection, and/or other electronic device that operatively connects the agent input system 440 to another system such as the system 430. A transceiver may include radio circuitry for wirelessly transmitting and receive information.

Each processor described herein, including the processor 444, generally includes circuitry for implementing the audio, visual, and/or logic functions of the agent input system 440. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory device, such as in the agent application 447 of the memory 446 of the agent input system 440.

Each memory device described herein, including the memory 446 for storing the agent application 447 and other information, may include any computer-readable medium. For example, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

As shown in FIG. 4, the memory 446 includes the agent application 447. In some embodiments, the agent application 447 includes an interface for communicating with, navigating, controlling, configuring, and/or using at least one of the system 430 or the agent input system 440. In some embodiments, the agent application 447 includes computer-executable program code portions for instructing the processor 444 to perform one or more of the functions of the agent application 447 described and/or contemplated herein. In some embodiments, the agent application 447 may include and/or use one or more network and/or system communication protocols.

Also shown in FIG. 4 is the user interface 449. In some embodiments, the user interface 449 includes one or more output devices, such as a display and/or speaker, for presenting information to the agent 445. In some embodiments, the user interface 449 includes one or more input devices, such as one or more buttons, keys, dials, levers, directional pads, joysticks, accelerometers, controllers, microphones, touchpads, touchscreens, haptic interfaces, microphones, scanners, motion detectors, cameras, and/or the like for receiving information from the agent 445. In some embodiments, the user interface 449 includes the input and display devices of a personal computer, such as a keyboard and monitor, which are operable to receive and display information.

FIG. 4 also illustrates a system 430, in accordance with an embodiment of the present invention. The system 430 may include any computerized apparatus that can be configured to perform any one or more of the functions of the system 430 described and/or contemplated herein. In accordance with some embodiments, for example, the system 430 may include a computer network, an engine, a platform, a server, a database system, a front end system, a back end system, a personal computer system, and/or the like. In some embodiments, such as the one illustrated in FIG. 4, the system 430 includes a communication interface 432, a processor 434, and a memory 436, which includes a system application 437 and a datastore 438 stored therein. As shown, the communication interface 432 is operatively and selectively connected to the processor 434, which is operatively and selectively connected to the memory 436.

It will be understood that the system application 437 may be configured to implement any one or more portions of the various user interfaces and/or process flow described herein. It will also be understood that, in some embodiments, the memory includes other applications. It will also be understood that, in some embodiments, the system application 437 is configured to communicate with the datastore 438, the agent input system 440 and/or the external system 420.

It will be further understood that, in some embodiments, the system application 437 includes computer-executable program code portions for instructing the processor 434 to perform any one or more of the functions of the system application 437 described and/or contemplated herein. In some embodiments, the system application 437 may include and/or use one or more network and/or system communication protocols.

In addition to the system application 437, the memory 436 also includes the datastore 438. As used herein, the datastore 438 may be one or more distinct and/or remote datastores. In some embodiments, the datastore 438 is not located within the system and is instead located remotely from the system. In some embodiments, the datastore 438 stores information or data described herein. For example, the datastore 438 may store information relating to at least one of the user, the user's financial institution account, offers, rules related to targeting offers to users, personal information, or the like.

It will be understood that the datastore 438 may include any one or more storage devices, including, but not limited to, datastores, databases, and/or any of the other storage devices typically associated with a computer system. It will also be understood that the datastore 438 may store information in any known way, such as, for example, by using one or more computer codes and/or languages, alphanumeric character strings, data sets, figures, tables, charts, links, documents, and/or the like. Further, in some embodiments, the datastore 438 may include information associated with one or more applications, such as, for example, the system application 437. It will also be understood that, in some embodiments, the datastore 438 provides a substantially real-time representation of the information stored therein, so that, for example, when the processor 434 accesses the datastore 438, the information stored therein is current or substantially current.

It will be understood that the embodiment of the system environment illustrated in FIG. 4 is exemplary and that other embodiments may vary. As another example, in some embodiments, the system 430 includes more, less, or different components. As another example, in some embodiments, some or all of the portions of the system environment 400 may be combined into a single portion. Likewise, in some embodiments, some or all of the portions of the system 430 may be separated into two or more distinct portions.

In addition, the various portions of the system environment 400 may be maintained for and/or by the same or separate parties. For example, the system 430 and the external system 420 may be maintained by separate parties.

It will also be understood that the system 430 may include and/or implement any embodiment of the present invention described and/or contemplated herein. For example, in some embodiments, the system 430 is configured to implement any one or more of the embodiments of the process flow 100, 200, 300, and 500 described and/or contemplated herein in connection with FIGS. 1, 2, 3, and 5 or any other process flow described herein.

Referring now to FIG. 5, a general process flow 500 is provided for reverse couponing. As used herein, reverse couponing may also be referred to as reverse offering. At block 510, the method comprises determining user information and account information associated with a user. At block 520, the method comprises adjusting offer information associated with an offer based on the user information and the account information, wherein the offer enables the user to receive at least one of a discount or a rebate on a purchase from a merchant. At block 530, the method comprises transmitting the adjusted offer to the user. As used herein, an offer may also be referred to as a coupon (e.g., an electronic coupon).

The system enables transmission of individualized or personalized offers to users. For example, an offer associated with a merchant may be a 10% discount on a purchase made from that merchant. The system enables adjusting the discount associated with the offer, such that some users are presented with an offer for receiving a 12% (or 8%) discount on a purchase made from the merchant, while other users are presented with an offer for receiving a 10% discount on the same purchase made from the same merchant.

In some embodiments, prior to transmitting or presenting an offer to a user, the system determines user information and account information associated with a user. The account information comprises a transaction history associated with the user's financial institution account. As described herein, the transaction history comprises at least one of a type of a transaction, a frequency associated with the transaction, an amount associated with the transaction, or a merchant associated with the transaction. As described herein, the user information comprises personal information associated with at least one of the user, a family member of the user, or a friend of the user. As described herein, the personal information comprises at least one of demographic information, salary information, contact information, residence address information, job profile information, education information, or social network information.

In some embodiments, the system receives information (e.g., from a social network) regarding a purchase transaction to be executed by the user within a predetermined period of time in the future. In other embodiments, the system determines or predicts a purchase transaction to be executed by the user within a predetermined period of time in the future. This prediction may be based on the account information (e.g., transaction history) and/or user information (e.g., change in residence address, social networking information, or the like) described herein. For example, the system may determine, based on the change in the user's residence address, that the user will make a purchase transaction associated with moving services, buying new furniture, or the like. As a further example, the system may determine, based on transaction history associated with recent transactions, that the user is getting ready to remodel the user's kitchen. In some embodiments, a purchase transaction may refer to any type of transaction associated with the user's financial institution account.

In some embodiments, the system receives information associated with an event in the user's life (e.g., the user is expecting the birth of a new kid within the next month). The system may predict the occurrence of this event based on at least one of the account information or the user information described herein. Alternatively or additionally, the user may self-declare the occurrence of this event to the merchant and/or to the financial institution. The system may determine whether to adjust offer information associated with the offer based on information associated with the event. In some embodiments, the system determines whether to adjust offer information associated with the offer after verifying the occurrence (or the predicted occurrence) of the event based on multiple sources of account information and/or user information.

In some embodiments, the system adjusts offer information associated with an offer based on the user information and the account information. As explained herein, the offer enables the user to receive at least one of a discount or a rebate on a purchase from a merchant. As explained herein, the offer is an offer to receive at least one of a discount or a rebate on at least one of a purchase previously made by the user, a purchase from a merchant from which the user previously made a purchase, an alternative to the purchase previously made by the user, an alternative to the purchase from the merchant from which the user previously made a purchase, or a product or service related to a purchase previously made by the user.

In some embodiments, adjusting the offer information comprises adjusting (either increasing or decreasing) an amount or a percentage of a discount or a rebate associated with a purchase transaction. Additionally or alternatively, in some embodiments, adjusting the offer information comprises adjusting a type of purchase transaction (e.g., product or service) for which the offer can be used. As an example, an offer may be valid for purchasing a refrigerator. The adjusted offer may be valid for purchasing a stove, and not a refrigerator. Alternatively, the adjusted offer may be valid for purchasing both a refrigerator and a stove. Additionally or alternatively, in some embodiments, adjusting the offer information comprises adjusting a merchant for which the offer can be used. As an example, an offer may be valid for a purchase from Merchant 'A.' The adjusted offer may be valid for a purchase from Merchant 'B,' and not 'Merchant A.' Alternatively, the adjusted offer may be valid for purchases both from Merchant 'A' and Merchant 'B.'

In some embodiments, the offer comprises a stored value card associated with a merchant. For example, the stored value card is a prepaid stored value card (e.g., a prepaid payment card) that is priced at $10,000 and enables the user to buy $10,500 of goods and/or services. As explained herein, the system may determine that the user is going to remodel the user's kitchen in the near future. Based on this determination, the system may adjust the stored value card's price to $9,500 for the user, and may transmit this adjusted offer to the user. If the user chooses to buy the stored value card for $9,500, the card will enable the user to buy $10,500 of goods and/or services.

After adjusting the offer, the system transmits the adjusted offer to the user. As explained herein, the offer is transmitted to the user based on determining a substantial match between the offer information and at least one of the user information or the account information. Additionally, as explained herein, the offer is transmitted to the user based on the user not being excluded by at least one user exclusion rule and the merchant not being excluded by at least one merchant exclusion rule. As explained herein, the at least one user exclusion rule comprises at least one of an affinity exclusion rule, a risk exclusion rule, or an account exclusion rule. Also as explained herein, the at least one merchant exclusion rule comprises a merchant category code exclusion rule. Also as explained herein, some merchants associated with an excluded merchant category code are not excluded.

In some embodiments, the step of determining a substantial match between the offer information and at least one of the user information or the account information is performed when determining user information and account information associated with the user (e.g., prior to adjusting the offer). If a substantial match is determined, the system determines whether to adjust the offer based on at least one of the user information or the account information. Additionally or alternatively, in some embodiments, the step of determining whether a substantial match exists is performed prior to transmitting the adjusted offer to the user.

Additionally, in some embodiments, the step of determining whether the user is excluded by at least one user exclusion rule and/or whether the merchant is excluded by at least one merchant exclusion rule is performed when determining user information and account information associated with the user (e.g., prior to adjusting the offer). If both the user and the merchant are not excluded, the system determines whether to adjust the offer based on at least one of the user information or the account information. Additionally or alternatively, in some embodiments, the step of determining whether the user is excluded by at least one user exclusion rule or whether the merchant is excluded by at least one merchant exclusion rule is performed prior to transmitting the adjusted offer to the user.

As explained herein, in some embodiments, the transmitted offer is presented via at least one of a user interface associated with the user's financial institution account, a user interface associated with the user's social network account, email, or text message. As explained herein, the offer may be presented to the user on a portable mobile communication device.

As explained herein, the user receives the at least one of the discount or the rebate associated with the offer after the user executes a purchase transaction associated with the offer. For example, after the user executes a purchase transaction associated with the adjusted offer, the adjusted offer and the purchase transaction are processed as part of a batch processing operation, wherein the batch processing operation comprises processing a plurality of financial institution accounts.

As explained herein, a user may also refer to a family or a household comprising a plurality of users (e.g., husband, wife, and kids). The account information and/or user information associated with the various users in the household may be considered cumulatively for various purposes described herein. The account information may comprise account information associated with a single account that is accessible to the various users in the household, or may comprise account information associated with separate accounts associated with various users in the household.

In some embodiments, the offer (either the first offer or the adjusted offer) is applied to the largest transaction (e.g., purchase transaction) that qualifies for the offer during a predetermined period (e.g., the previous week). In other embodiments, the offer is applied to multiple transactions that qualify for the offer during a predetermined period. In such embodiments, the offer may be applied individually to each qualifying transaction, or at least some (or all) of the qualifying transactions during the predetermined period may be aggregated and the offer is applied to the aggregate. In other embodiments, the offer is applied to at least one transaction that occurs during a period defined by the merchant (e.g., from 4 PM to 6 PM on a particular day). In other embodiments, the offer is applied to at least one transaction greater than a predetermined amount that occurs during a predetermined period (e.g., a period defined by the merchant). In other embodiments, the offer is applied to the first (or second, or third, or the like) transaction greater than a predetermined amount (and/or less than a second predetermined amount) after the user activated the offer. In other embodiments, the offer is applied to the largest transaction on the first day (or other predetermined period such as a particular second, minute, hour, day, week, month, or the like) when the user makes a transaction after activating the offer. Therefore, for example, the user activates an offer on Monday. On Wednesday morning, the user executes a $10 transaction that qualifies for the offer. On Wednesday evening, the user executes a $20 transaction that qualifies for the offer. In this example, the offer is applied to the $20 transaction, and not to the $10 transaction. In some embodiments, the date of a transaction is the date when a user executes the transaction. In other embodiments, the date of a transaction is the date when the merchant settles the transaction.

In some embodiments, the system described herein may determine that the user has activated an offer, but has not made a purchase associated with the offer for a predetermined period after activating the offer. Additionally, the system may determine, based on the user's account information (e.g., transaction history), that the user has made purchases for goods or services at a merchant that competes with the merchant associated with the activated offer. In order to encourage the user to make a purchase associated with the activated offer, the system may adjust the offer (e.g., increase the rebate or discount amount associated with the offer, replace the merchant associated with the offer with the merchant from which the user made purchases during the predetermined period, or the like). The offer adjustment may be communicated to the user to encourage the user to make a purchase associated with the adjusted offer. Additionally or alternatively, the system may, at the time of settlement of the user's purchase made during the predetermined period after activating the offer, substitute the offer with the adjusted offer (may be referred to as the second offer) so that the user receives a discount or rebate on the user's purchase.

In some embodiments, the system described herein may determine that the user does not activate offers associated with a particular merchant (and/or service or good), but has made purchases from a competing merchant for similar services or goods. Based on this determination, the system may, in the future, transmit to the user offers associated with the merchant from which the user made purchases. In other embodiments, at the time of settlement of the user's purchases, the system applies an offer associated with the merchant from which the user made purchases.

In accordance with embodiments of the invention, the term "module" with respect to a system may refer to a hardware component of the system, a software component of the system, or a component of the system that includes both hardware and software. As used herein, a module may include one or more modules, where each module may reside in separate pieces of hardware or software.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory or the like) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. An apparatus for reverse couponing, the apparatus comprising:
   at least one memory comprising a volatile memory and a non-volatile memory, wherein the volatile memory and the non-volatile memory are independent of each other;
   at least one processor; and
   a first module stored in the non-volatile memory, executable by the at least one processor, and configured to cause the at least one processor to:
      electronically receive a first input information associated with a user, wherein the first input information comprises account information associated with a user's financial institution account and personal information associated with the user;
      store the first input information in a queue associated with the volatile memory until a second input information is received, wherein queuing further comprises reorganizing the first input information into the volatile memory;
      receive second input information associated with the user, wherein the second input information comprises social network information associated with the user;
      store the second input information in the queue associated with the volatile memory, wherein queuing the second input information further comprises reorganizing the second input information into the volatile memory; and
      determine a user profile based on at least the first input information and the second input information stored in the queue associated with the volatile memory;
   a second module stored in the non-volatile memory, executable by the at least one processor, and configured to cause the at least one processor to:
      determine offer information associated with an offer based on at least the user profile determined using the first input information and the second input information stored in the queue associated with the volatile memory, the offer being associated with a variable discount or a rebate;
      adjust the offer information associated with the offer based on the user information and the account information, wherein the offer enables the user to receive at least one of a discount or a rebate on a purchase from a merchant at a predetermined time, wherein the purchase comprises a plurality of transactions executed by the user with the merchant, wherein adjusting the offer information comprises either increasing or decreasing the discount or the rebate, wherein adjusting further comprises:
         determining that the user is not excluded from receiving at least one offer based on at least a first user exclusion rule; and
         determining that the offer from the merchant associated with a predetermined category code is not excluded from being presented to the user based on at least a first merchant exclusion rule; and
      determine that the user has executed the purchase with the merchant, wherein determining further comprises:
         determining that the user is excluded from receiving the offer for the purchase based on at least a second user exclusion rule; and
         determining that the offer from the merchant is excluded from being presented to the user based on at least the second merchant exclusion rule;
      wherein the second user exclusion rule and the second merchant exclusion rule are applied before the purchase is settled at a predetermined future settlement date; and
      apply the at least one offer to a largest transaction among the plurality of transactions associated with the purchase executed by the user at the predetermined future settlement date based on at least determining that the user and the offer from the merchant are not excluded at the time of the execution of the purchase and are excluded at the predetermined future settlement date.

2. The apparatus of claim 1, wherein the first module and/or the second module is configured to determine the user information and the account information associated with the user, wherein determining further comprises determining a purchase transaction to be executed by the user within a predetermined period of time in the future.

3. The apparatus of claim 1, wherein the first module and/or the second module is further configured to cause the at least one processor to:
   determine the offer is activated based on a preconfigured user preference prior to executing a transaction qualifying for the offer at a physical point of sale terminal of the merchant; and
   determine execution of the transaction qualifying for the offer at the physical point of sale terminal, wherein the merchant and the user are not alerted, at the point of sale terminal, about the discount or rebate on the transaction.

4. The apparatus of claim 1, wherein the offer comprises a stored value card associated with a merchant or an electronic coupon.

5. The apparatus of claim 1, wherein the first module and/or the second module is further configured to adjust the offer information, wherein adjusting further comprises adjusting an amount or a percentage of the discount or the rebate associated with a purchase transaction.

6. The apparatus of claim 1, wherein the first module and/or the second module is further configured to adjust the offer information, wherein adjusting comprises adjusting a type of purchase transaction for which the offer can be used.

7. The apparatus of claim 1, the first module and/or the second module is further configured to adjust the offer information, wherein the adjusting comprises changing a merchant for which the offer can be used.

8. The apparatus of claim 1, wherein the first module and/or the second module is further configured to transmit the offer to the user based on at least one of the user information or the account information.

9. The apparatus of claim 8, wherein the first module and/or the second module is further configured to determine whether to transmit the offer to the user based on the at least one of the user information or the account information prior to adjusting the offer information associated with the offer.

10. The apparatus of claim 1, the first module and/or the second module is further configured to process the purchase transaction as part of a batch processing operation after the user executes a purchase transaction associated with the offer, wherein the batch processing operation comprises processing a plurality of financial institution accounts.

11. The apparatus of claim 1, wherein the account information comprises a transaction history associated with the user's financial institution account, and wherein the transaction history comprises at least one of a type of a transaction, a frequency associated with the transaction, an amount associated with the transaction, or a merchant associated with the transaction, and wherein the user information comprises personal information associated with at least one of the user, a family member of the user, or a friend of the user, wherein the personal information comprises at least one of demographic information, salary information, contact information, residence address information, job profile information, or education information.

12. The apparatus of claim 1, wherein the first module and/or the second module is further configured to present the offer via at least one of a user interface associated with the user's financial institution account, a user interface associated with the user's social network account, email, or text message.

13. The apparatus of claim 1, wherein the first module and/or the second module is further configured to present the offer to the user on a portable mobile communication device.

14. The apparatus of claim 1, wherein the offer comprises an offer to receive at least one of the discount or the rebate on at least one of: a purchase previously made by the user, a purchase from a merchant from which the user previously made a purchase, an alternative to the purchase previously made by the user, an alternative to the purchase from the merchant from which the user previously made a purchase, or a product or service related to a purchase previously made by the user.

15. The apparatus of claim 1, wherein the purchase comprises at least one of: at least one purchase associated with a predetermined period, at least one purchase associated with a predetermined amount, an aggregate of a plurality of purchases, or a largest purchase.

16. A computerized method for reverse couponing, the method comprising:
electronically receiving, a first input information associated with a user, wherein the first input information comprises account information associated with a user's financial institution account and personal information associated with the user;
storing, using a computing device processor, the first input information in a queue associated with the volatile memory until a second input information is received, wherein queuing further comprises reorganizing the first input information into the volatile memory;
receiving, using a computing device processor, second input information associated with the user, wherein the second input information comprises social network information associated with the user;
storing, using a computing device processor, the second input information in the queue associated with the volatile memory, wherein queuing the second input information further comprises reorganizing the second input information into the volatile memory;
determining, using a computing device processor, a user profile based on at least the first input information and the second input information stored in the queue associated with the volatile memory;
determining, using a computing device processor, offer information associated with an offer based on at least the user profile determined using the first input information and the second input information stored in the queue associated with the volatile memory, the offer being associated with a variable discount or a rebate;
adjusting, using a computing device processor, the offer information associated with the offer based on the user information and the account information, wherein the offer enables the user to receive at least one of a discount or a rebate on a purchase from a merchant at a predetermined time, wherein the purchase comprises a plurality of transactions executed by the user with the merchant, wherein adjusting the offer information comprises either increasing or decreasing the discount or the rebate, wherein adjusting further comprises:
determining that the user is not excluded from receiving at least one offer based on at least a first user exclusion rule; and
determining that the offer from the merchant associated with a predetermined category code is not excluded from being presented to the user based on at least a first merchant exclusion rule; and
determining, using a computing device processor, that the user has executed the purchase with the merchant, wherein determining further comprises:
determining that the user is excluded from receiving the offer for the purchase based on at least a second user exclusion rule; and
determining that the offer from the merchant is excluded from being presented to the user based on at least the second merchant exclusion rule;
wherein the second user exclusion rule and the second merchant exclusion rule are applied before the purchase is settled at a predetermined future settlement date; and
applying, using a computing device processor, the at least one offer to a largest transaction among the plurality of transactions associated with the purchase executed by the user at the predetermined future settlement date based on at least determining that the user and the offer from the merchant are not excluded at the time of the execution of the purchase and are excluded at the predetermined future settlement date.

17. The method of claim 16, wherein the first module and/or the second module is configured to determine the user information and the account information associated with the user, wherein determining further comprises determining a purchase transaction to be executed by the user within a predetermined period of time in the future.

18. The method of claim 16, wherein the first module and/or the second module is further configured to cause the at least one processor to:
determine the offer is activated based on a preconfigured user preference prior to executing a transaction qualifying for the offer at a physical point of sale terminal of the merchant; and
determine execution of the transaction qualifying for the offer at the physical point of sale terminal, wherein the merchant and the user are not alerted, at the point of sale terminal, about the discount or rebate on the transaction.

19. The method of claim 16, wherein the offer comprises a stored value card associated with a merchant or an electronic coupon.

20. A computer program product for reverse couponing, the computer program product comprising:
a non-transitory computer-readable medium comprising a set of codes for causing a computer to:
electronically receive a first input information associated with a user, wherein the first input information comprises account information associated with a user's financial institution account and personal information associated with the user;
store the first input information in a queue associated with the volatile memory until a second input information is received, wherein queuing further comprises reorganizing the first input information into the volatile memory;

receive second input information associated with the user, wherein the second input information comprises social network information associated with the user;

store the second input information in the queue associated with the volatile memory, wherein queuing the second input information further comprises reorganizing the second input information into the volatile memory;

determine a user profile based on at least the first input information and the second input information stored in the queue associated with the volatile memory;

determine offer information associated with an offer based on at least the user profile determined using the first input information and the second input information stored in the queue associated with the volatile memory, the offer being associated with a variable discount or a rebate;

adjust the offer information associated with the offer based on the user information and the account information, wherein the offer enables the user to receive at least one of a discount or a rebate on a purchase from a merchant at a predetermined time, wherein the purchase comprises a plurality of transactions executed by the user with the merchant, wherein adjusting the offer information comprises either increasing or decreasing the discount or the rebate, wherein adjusting further comprises:

determining that the user is not excluded from receiving at least one offer based on at least a first user exclusion rule; and
  determining that the offer from the merchant associated with a predetermined category code is not excluded from being presented to the user based on at least a first merchant exclusion rule; and determine that the user has executed the purchase with the merchant, wherein determining further comprises:

determining that the user is excluded from receiving the offer for the purchase based on at least a second user exclusion rule; and
  determining that the offer from the merchant is excluded from being presented to the user based on at least the second merchant exclusion rule;
  wherein the second user exclusion rule and the second merchant exclusion rule are applied before the purchase is settled at a predetermined future settlement date; and apply the at least one offer to a largest transaction among the plurality of transactions associated with the purchase executed by the user at the predetermined future settlement date based on at least determining that the user and the offer from the merchant are not excluded at the time of the execution of the purchase and are excluded at the predetermined future settlement date.

* * * * *